Patented Feb. 1, 1944

2,340,613

UNITED STATES PATENT OFFICE 2,340,613

SALT PURIFICATION

Ezra Clinton Perkins, Niagara Falls, N. Y., assignor to E. I. du Pont de Nemours & Company, Wilmington, Del., a corporation of Delaware No Drawing. Application March 4, 1940,
Serial No. 322,167

3 Claims. (Cl. 209—166)

This invention relates to the purification of sodium chloride and especially to the removal of calcium sulfate from an impure sodium chloride such as crude rock salt.

Crude rock salt as produced by mining operations ordinarily contains as impurities calcium sulfate which is usually present as the mineral anhydrite, or as hydrated calcium sulfates, together with varying amounts of siliceous material and other impurities such as compounds of iron and magnesium. Deposits of rock salt also often contain a black material which is probably carbonaceous in nature. It has been found that the particles of salt which are colored with this black material have an especially high calcium sulfate content. For the purposes of chemical manufacture, it is often necessary to purify salt to a degree greater than required for use as food or for treating food products. In particular, in some chemical operations, it is essential that the calcium sulfate content be reduced to a very low concentration, for example, lower than 0.05% by weight.

Heretofore, crude sodium chloride has been purified by a treatment such as washing with water or with purified brine, recrystallizing from saturated solutions and the like. Most of these treatments are inadequate for the removal of calcium sulfate and heretofore the only feasible methods for removing calcium sulfate which have been employed consist in dissolving the salt and treating the solution with a suitable chemical reagent or reagents to precipitate calcium ion, sulfate ion or both, filtering to remove the precipitate and evaporating the purified brine. This method, as well as the other methods above described, is expensive because of the heat required for evaporation of large quantities of the salt solution in order to produce a pure dry sodium chloride suitable for chemical manufacture.

An object of the present invention is to provide an improved method for the purification of sodium chloride. A further object is to provide an improved and inexpensive method for separating calcium sulfate from sodium chloride. Another object is to provide an improved means for purifying rock salt to produce pure sodium chloride suitable for chemical manufacturing operations. Still other objects will be apparent from the following description of my invention.

In practicing my invention, I first dissolve crude salt, filter the solution to remove insoluble materials, and evaporate the filtered solution to a point which will cause precipitation of part or substantially all of the calcium sulfate which was dissolved during the dissolving operation. This degree of evaporation usually also causes a large amount of salt to crystallize out with the calcium sulfate. The resulting mixture of saturated brine and solid calcium sulfate and sodium chloride crystals then are subjected to a froth flotation operation. Before subjecting this mixture to froth flotation, the concentration of solids in the pulp may be adjusted by either adding saturated salt solution or removing a part of the saturated salt solution from the mixture by partial filtration or further evaporation.

In carrying out the froth flotation, I employ as froth flotation collector reagent a reagent which selectively or preferentially films the calcium sulfate, but which has little or no filming action on the sodium chloride. While a variety of different collector reagents may be employed, I prefer to use a soluble fatty acid such as oleic acid or a soluble fatty acid soap such as sodium oleate or potassium oleate. In some cases, the collector agent also is suitable as frothing agent, for example, in the case of sodium oleate. When a fatty acid such as oleic acid is used as froth flotation reagent, I prefer also to add a frothing agent such as sodium oleate, a phenolic compound such as cresylic acid or a light mineral oil. I may also use as froth flotation reagents sulfated higher alcohols and their salts and higher alcohols derived from oils, fats, and waxes, for example, alcohols made by reduction of esters of high molecular weight fatty acids. However, my invention is not restricted to the employment of any particular flotation reagents as will be apparent to those skilled in the art of froth flotation.

An advantage of the present invention is that it provides means for removing calcium sulfate and other impurities from crude sodium chloride efficiently and at relatively low cost. Furthermore, the degree of purification obtained by my process is exceedingly high, as the method is readily adapted to reduce the calcium sulfate content of crude salt to less than 0.01% by weight and in some instances this method has, in a single flotation operation, produced a solid salt which was substantially free from any detectable amount of calcium sulfate. Also, I have found that the other impurities commonly occurring in crude salt, e. g. siliceous materials, iron and magnesium compounds, calcium carbonate, carbonaceous substances and the like, are floated out with the calcium sulfate.

I claim:

1. A process for removing calcium sulfate from crude rock salt which comprises dissolving said salt in water, separating insolubles from the solution, evaporating said solution sufficiently to precipitate dissolved calcium sulfate together with sodium chloride crystals and subjecting the resulting suspension of calcium sulfate and sodium chloride to froth flotation in the presence of a froth flotation reagent which selectively films said calcium sulfate, floating said calcium sulfate in the resulting froth and separating said froth from said suspension.

2. A process for removing calcium sulfate from crude rock salt which comprises dissolving said salt in water, separating insolubles from the solution, evaporating said solution sufficiently to precipitate dissolved calcium sulfate together with sodium chloride crystals and subjecting the resulting suspension of calcium sulfate and sodium chloride to froth flotation in the presence of oleic acid and cresylic acid, floating said calcium sulfate in the resulting froth and separating said froth from said suspension.

3. A process for removing calcium sulfate from crude rock salt which comprises dissolving said salt in water, separating insolubles from the solution, evaporating said solution sufficiently to precipitate dissolved calcium sulfate together with sodium chloride crystals and subjecting the resulting suspension of calcium sulfate and sodium chloride to froth flotation in the presence of a froth flotation reagent selected from the group consisting of oleic acid, sodium oleate, potassium oleate, sulfated higher alcohols and their salts, and alcohols made by reduction of high molecular weight fatty acids, floating said calcium sulfate in the resulting froth and separating said froth from said suspension.

EZRA CLINTON PERKINS.